United States Patent

Hu et al.

Patent Number: 5,784,907
Date of Patent: Jul. 28, 1998

[54] ADJUSTABLE AND EXPANDABLE DEVICE FOR LOCKING GEAR-SHIFTING LEVER OF MOTOR VEHICLE

[76] Inventors: Hsi-Yen Hu, 14 Lane Pa Tei, Yung Ching Hsiang, Changhua, Taiwan; Yuan-Chih Chiang, 386 Shan Chiao Road, Sec, 3, She Tou Hsiang, Changhua, Taiwan

[21] Appl. No.: 899,209

[22] Filed: Jul. 23, 1997

[51] Int. Cl.⁶ .................................... B60R 25/06
[52] U.S. Cl. ................ 70/203; 70/247; 248/552
[58] Field of Search .............. 70/254, 198-203, 70/245-248, 237, 209, 211, 212, 238; 248/551-553

[56] References Cited

U.S. PATENT DOCUMENTS

| | | | |
|---|---|---|---|
| 1,293,362 | 2/1919 | Day | 70/200 |
| 1,362,377 | 12/1920 | Weidner | 70/203 |
| 4,825,671 | 5/1989 | Wu | 70/238 |
| 4,835,999 | 6/1989 | Chant | 70/238 |
| 5,038,667 | 8/1991 | Slater | 70/238 X |
| 5,481,783 | 1/1996 | Liou | 70/247 X |

*Primary Examiner*—Lloyd A. Gall
*Attorney, Agent, or Firm*—Beveridge, DeGrandi, Weilacher & Young LLP

[57] ABSTRACT

A locking device is intended for use in disabling the gear-shifting lever of a motor vehicle and is made up of a body and a shackle having two arms engageable and disengageable with the body. The body is composed of a horizontal tube, a vertical tube, a shackle piece, a slide piece, and a pivoting seat. The vertical tube is fastened pivotally at one end thereof with the horizontal tube which is in turn fastened adjustably at another end thereof with one end of the slide piece. The slide piece is fastened pivotally at another end thereof with the pivoting seat which is fastened securely with the body of the motor vehicle. The shackle piece is adjustably fastened with the vertical tube. The shackle piece has two arm holes for receiving two arms of the shackle to disable the gear-shifting lever of the motor vehicle. Both slide piece and shackle piece are adjustable and expandable.

1 Claim, 4 Drawing Sheets

5,784,907

1

ADJUSTABLE AND EXPANDABLE DEVICE FOR LOCKING GEAR-SHIFTING LEVER OF MOTOR VEHICLE

FIELD OF THE INVENTION

The present invention relates generally to a locking device, and more particularly to an adjustable and expandable lock for incapacitating the gear-shifting lever of a motor vehicle.

BACKGROUND OF THE INVENTION

As shown in FIG. 1, a prior art device for locking a gear-shifting lever of the motor vehicle is composed of a curved plate A and a shackle ( not shown in the drawing). The curved A is provided at the top portion thereof with two shackle holes A1 for receiving both arms of the shackle, and at the bottom portion thereof with a plurality of fastening holes A2 engageable with a bolt B in conjunction with a nut C for locating the curved plate A.

Such a padlock-like device of the prior art as described above is defective in design in that it can not be easily installed in a motor vehicle by an amateur, and that it is therefore not in conformity with the principle of do-it-yourself (DIY), and further that it is rather vulnerable to tampering by an unauthorized person.

SUMMARY OF THE INVENTION

It is therefore the primary objective of the present invention to provide a device for locking the gear-shifting lever of a motor vehicle. The device can be easily installed by the owner of the motor vehicle without the help of a mechanic.

It is another objective of the present invention to provide a locking device for incapacitating the gear-shifting lever of a motor vehicle. The locking device can not be easily tampered with by an unauthorized person.

In keeping with the principle of the present invention, the foregoing objectives of the present invention are attained by an adjustable and expandable locking device, which is composed of a horizontal tube, a slide piece, a vertical tube, a shackle piece, a pivoting seat and a shackle. The pivoting seat enables the device to be fastened with the body of a motor vehicle. The pivoting seat is fastened pivotally with the slide piece which is in turn adjustably fastened with the horizontal tube. The horizontal tube is fastened pivotally at one end thereof with a bottom end of the vertical tube. The shackle piece is adjustably fastened at one end thereof with the upper end of the vertical tube. The shackle piece is provided at another end thereof with two shackle holes for receiving both arms of the shackle to disable the gear-shifting lever of a motor vehicle.

The foregoing objectives, features, functions, and advantages of the present invention will be more readily understood upon a thoughtful deliberation of the following detailed description of a preferred embodiment of the present invention with reference to the accompanying drawings.

2

Figures 1, 3:
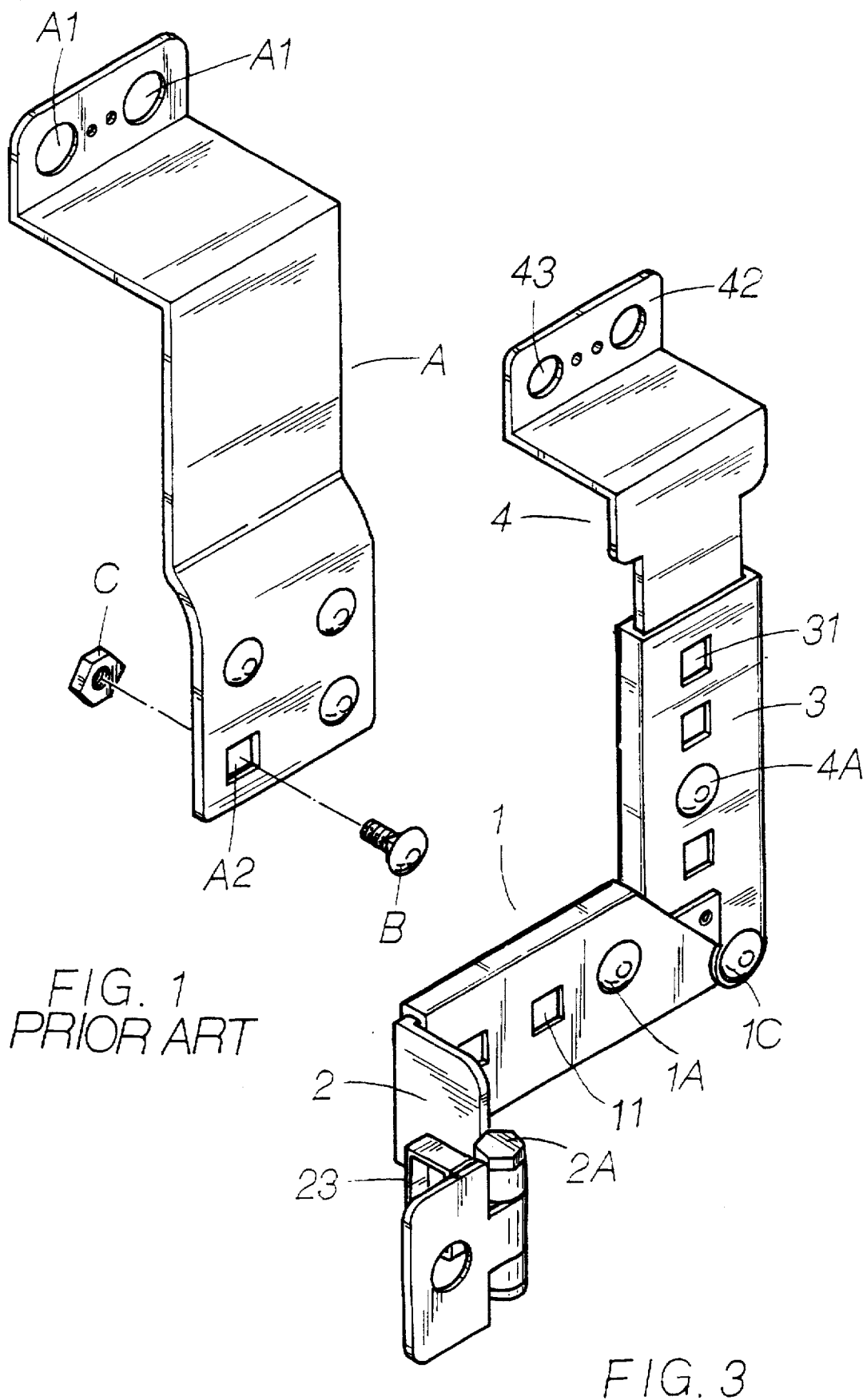
FIG. 1 shows a perspective view of a locking device of the prior art.
FIG. 3 shows a schematic view of the present invention in combination.
Figure 2:
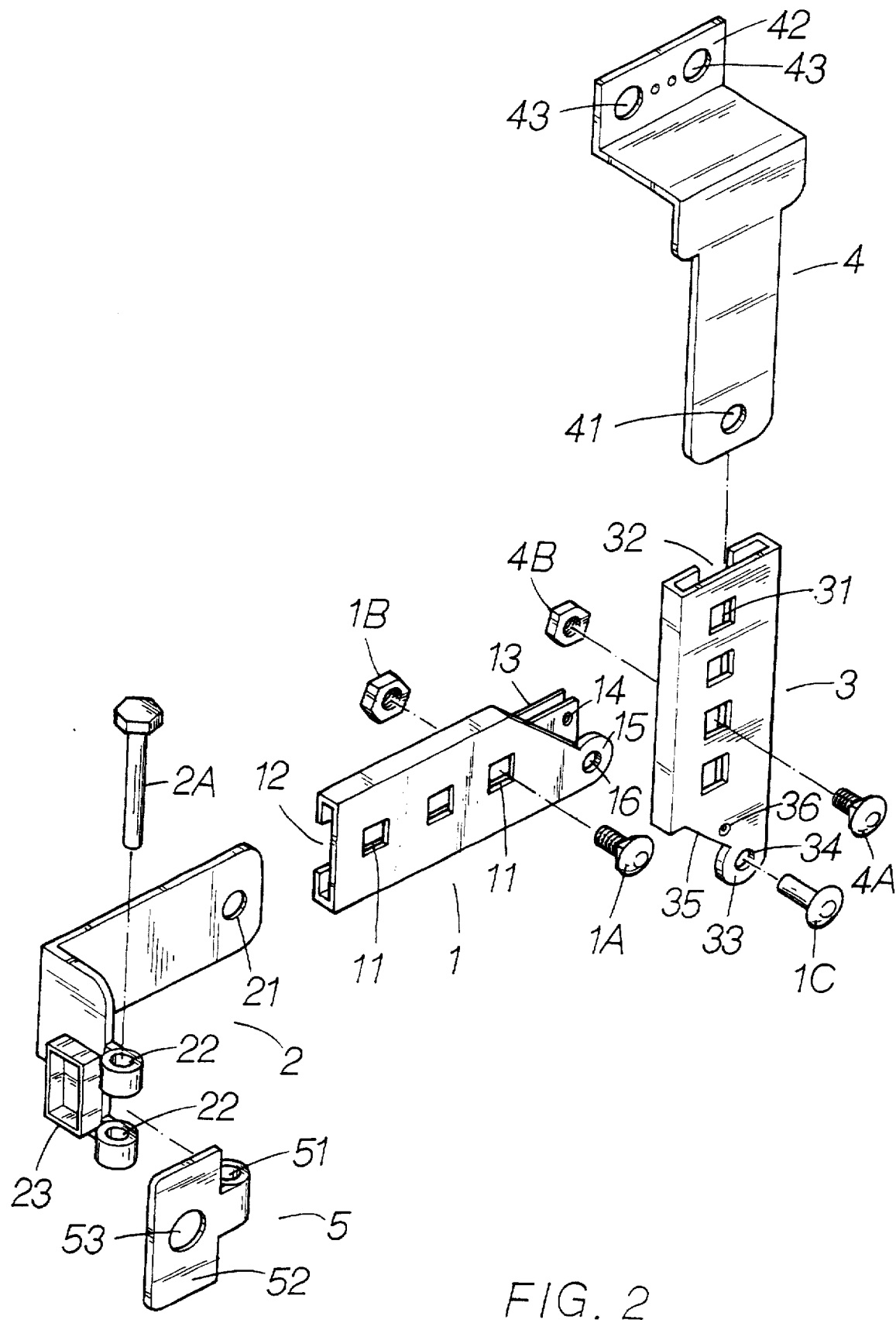
FIG. 2 shows an exploded view of a locking device of the present invention.
Figure 4:
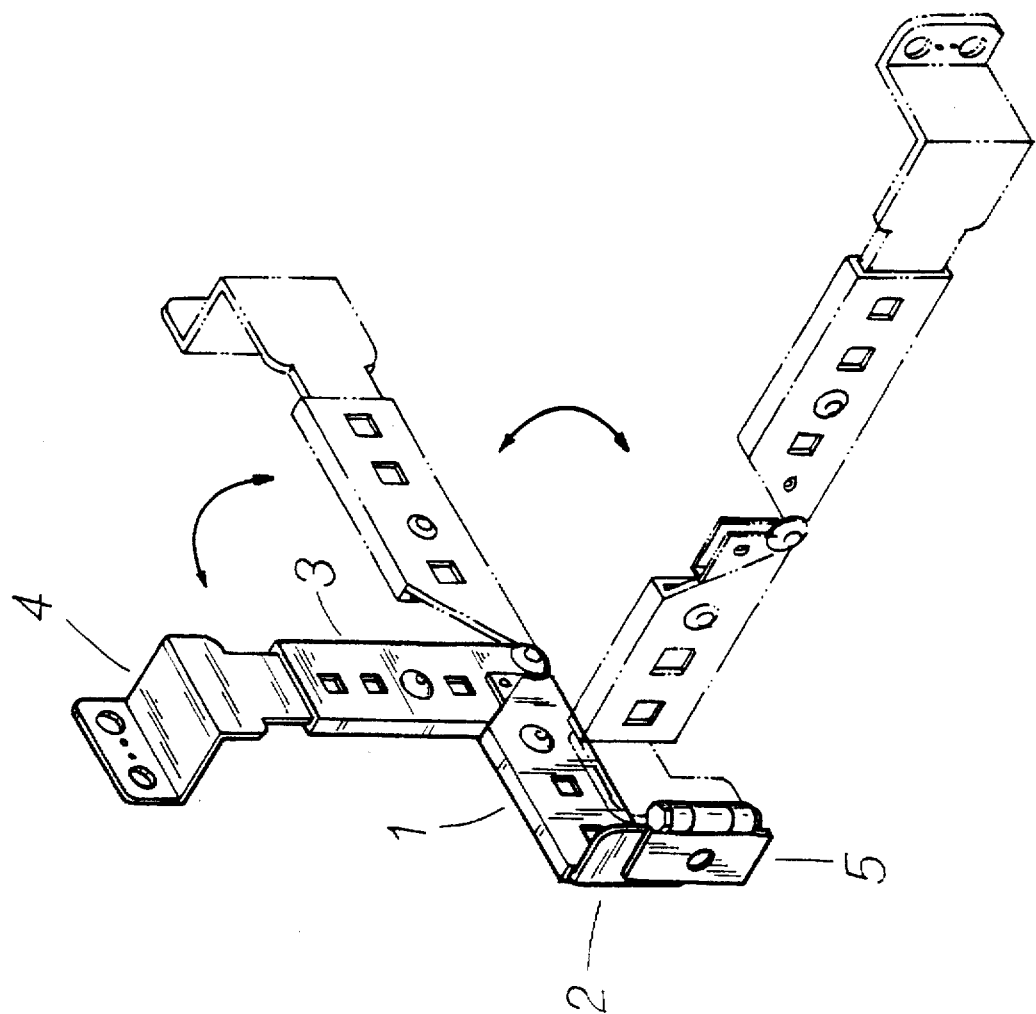

FIG. 4 shows a schematic view of the present invention at work.

Figure 5:
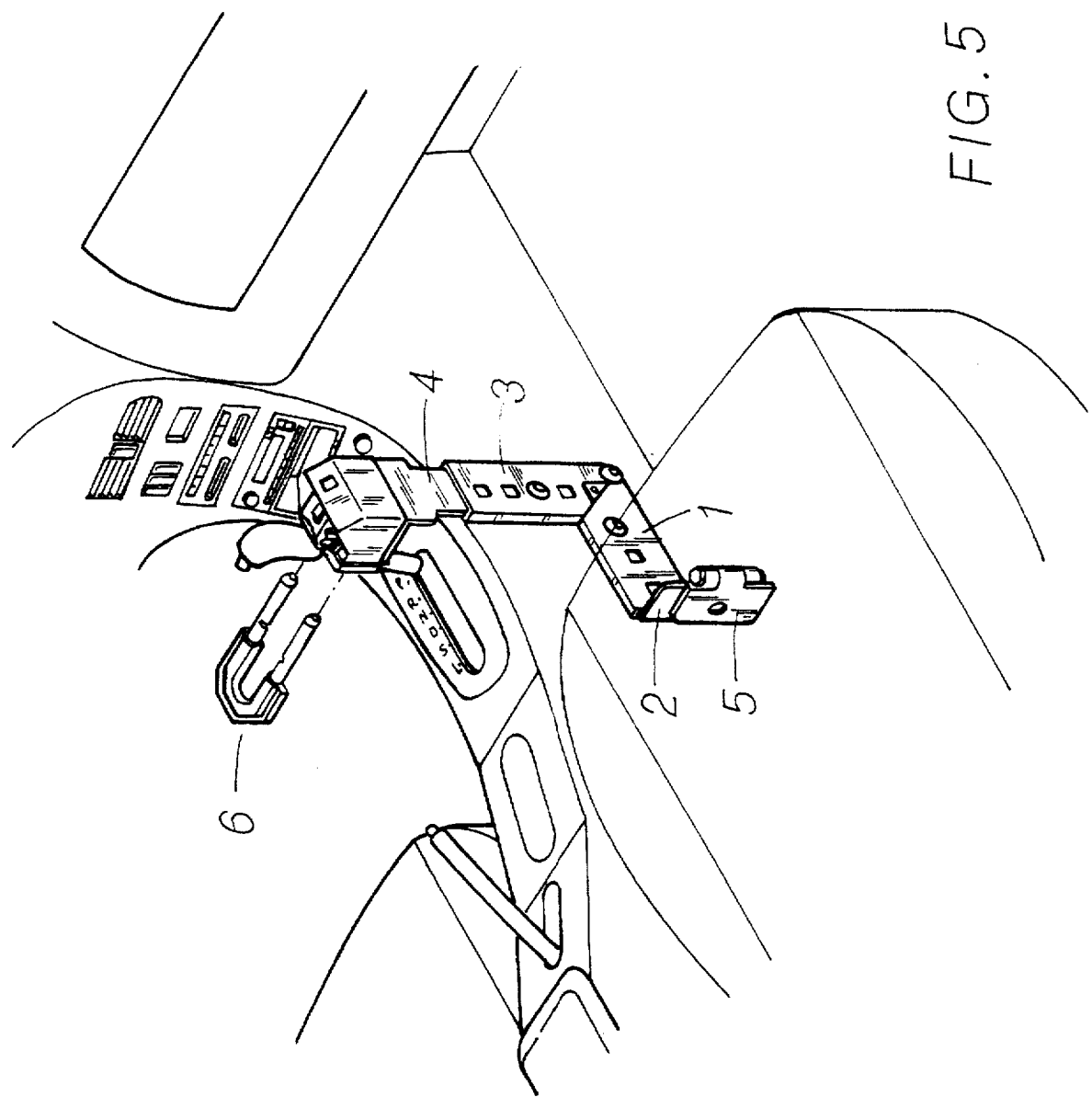

FIG. 5 shows another schematic view of the present invention at work.

DETAILED DESCRIPTION OF THE EMBODIMENT

As shown in all drawings provided herewith, a device of the present invention is intended for use in locking the gear-shifting lever of a motor vehicle to prevent an unauthorized person from operating the motor vehicle. The device of the present invention is similar in principle to the padlock and is composed of a lock body and a shackle.

The lock body of the present invention is made up of a horizontal tube 1, a slide piece 2, a vertical tube 3, a shackle piece 4, and a pivoting seat 5. The horizontal tube 1 is of a hollow construction and is provided in one side wall thereof with a plurality of adjusting holes 11, and in another side wall thereof with a slot 12 in which the slide piece 2 is adjustably located. The slide piece 2 is provided at one end thereof with a fastening hole 21 corresponding in location to the adjusting holes 11 of the horizontal tube 1 and engageable with a bolt 1A and 1B for locating the slide piece 2 in the slot 12 of the horizontal tube 1. The horizontal tube 1 is provided at another end thereof with a connection piece 13 which has a retaining hole 14. The horizontal tube 1 is further provided at another end thereof with a lug 15 opposite to the connection piece 13 and having a round hole 16, which is engaged with a pivot 1C for fastening pivotally the horizontal tube 1 with the vertical tube 3. The vertical tube 3 is provided in one side wall thereof with a plurality of adjusting holes 31 which are arranged on various levels so as to enable the shackle piece 4 to cooperate with the gear-shifting levers of motor vehicles of various models. The vertical tube 3 is further provided with a sliding slot 32 extending in the direction of the longitudinal axis of the vertical tube 3 for slidably receiving therein the shackle piece 4. The vertical tube 3 is further provided at the lower end thereof with a lug 33 having a pivot hole 34 for receiving therein the pivot 1C for fastening pivotally the vertical tube 3 with the horizontal tube 1. The vertical tube 3 is still further provided at the lower end thereof with an inclined edge 35 contiguous to the lug 33 and having a retaining hole 36. The shackle piece 4 is provided at the bottom end thereof with a through hole 41 which is engaged with a fastening bolt 4A in conjunction with a nut 4B for fastening adjustably the shackle piece 4 is provided at the upper end 42 thereof with two arm holes 43 for receiving therein both arms of a shackle 6, as illustrated in FIG. 5. In the similar manner, the slide piece 2 is adjustably fastened with the horizontal tube 1 by means of a through hole 21 which is corresponding in location to the adjusting holes 11 of the horizontal tube 1. The slide piece 2 is provided at another end thereof with two pivoting holes 22 for fastening pivotally the slide piece 2 with the pivoting seat 5 in conjunction with a pivoting pin 2A engageable with a pivoting hole 51 of the pivoting seat 5. The slide piece 2 is further provided with a contact block 23 contiguous to the pivoting holes 22. The pivoting seat 5 has a body 52, which is provided with a fastening hole 53 for fastening the pivoting seat 5 with the body of a motor vehicle.

It is therefore readily apparent that the body of the locking device of the present invention is adjustable and expandable. In other words, the shackle piece 4 is vertically expandable, whereas the slide piece 2 is horizontally expandable. The vertical tube 3 is adjustable in position in relation to the horizontal tube 1, whereas the slide tube 2 is adjustable in position in relation to the pivoting seat 5. As a result, the locking device of the present invention is versatile in design in that it can be used to disable the gear-shifting lever of a motor vehicle of any model. It must be added here that the slide piece 2 is provided with the contact block 23 for enabling the pivoting seat 5 to be in an intimate contact with the slide piece 2, thereby giving an added protection to the locking device of the present invention.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A locking device for disabling the gear-shifting lever of a motor vehicle, said locking device comprising a body and a shackle having two arms engageable and disengageable with said body;

wherein said body comprises:

a horizontal tube of a hollow construction and having a plurality of adjusting holes, a slot, and a lug having a pivoting hole, said adjusting holes being arranged at an interval along the direction of a longitudinal axis of said horizontal tube, said slot extending along the direction of the longitudinal axis of said horizontal tube;

a vertical tube of a hollow construction and having a plurality of adjusting holes, a slot, and a lug having a pivoting hole which is engaged with a pivot for fastening pivotally said vertical tube adjustably located in a vertical position in relation to said horizontal tube, said adjusting holes of said vertical tube being arranged at an interval along the direction of a longitudinal axis of said vertical tube, said slot extending along the direction of the longitudinal axis of said vertical tube;

a shackle piece provided at one end thereof with a fastening hole corresponding in location to said adjusting holes of said vertical tube and engageable with a fastening bolt which is in turn engageable with any one of said adjusting holes of said vertical tube, said shackle piece further provided at another end thereof with two arm holes for receiving said two arms of said shackle, said shackle piece being adjustably received in said slot of said vertical tube such that said shackle piece is located in said slot by said fastening bolt;

a slide piece provided at one end thereof with a fastening hole corresponding in location to said adjusting holes of said horizontal tube and engageable with a fastening bolt which is in turn engageable with any one of said adjusting holes of said horizontal tube, said slide piece being adjustably received in said slot of said horizontal tube such that said slide piece is located in said slot by said fastening bolt, said slide piece further provided at another end thereof with a lug having a pivoting hole;

a pivoting seat provided with a pivoting hole for fastening pivotally said pivoting seat with said slide piece by a pivot which is engaged with said pivoting hole of said pivoting seat and said pivoting hole of said lug of said slide piece, said pivoting seat further provided with a fastening hole for fastening said pivoting seat with a body of the motor vehicle.

* * * * *